Patented May 10, 1949

2,469,748

UNITED STATES PATENT OFFICE 2,469,748

ESTERS OF AZELAIC ACID AS PLASTICIZERS FOR RUBBERLIKE POLYMERS

Winthrope C. Smith, Westfield, N. J., assignor to Standard Oil Development Company, a corporation of Delaware No Drawing. Application August 22, 1945,
Serial No. 612,123

7 Claims. (Cl. 260—31.8)

This invention relates particularly to the use of an azelate to improve cold resistance of a vulcanized rubbery material such as formed from copolymers of isobutylene with small amounts of isoprene.

Rubber articles intended for use where low temperatures are encountered, as in automobiles and airplanes, are required to remain flexible at temperatures as low as —50° and —60° F. Vulcanizates of natural rubber with certain sulfur ratios and accelerators have shown good flexibility at sub-zero temperatures. Certain synthetic polymer vulcanizates, particularly vulcanized copolymers of olefins with diolefins, have also shown as good, if not better, flexibility at moderately low sub-zero temperatures, but it has been found desirable to improve their low temperature flexibility still further to meet the stated requirements.

An object of this invention is to impart improved cold resistance to a vulcanizate of an olefinic copolymer by incorporating a suitable derivative of azelaic acid.

A more specific object of this invention is to use an azelate of an aliphatic or aromatic alcohol for conferring on vulcanized copolymers of isobutylene with isoprene required flexibility at temperature as low as —50° and —60° F. without deleterious effects on other desirable physical properties of the vulcanizate.

Polymeric materials synthesized by low temperature copolymerization of isobutylene with isoprene have become known by the term "butyl rubber." Methods of manufacturing, compounding, and vulcanizing these materials are given in the U. S. Patent 2,356,128 of August 22, 1944, to R. M. Thomas and W. J. Sparks. Properties of these materials are further described in an article beginning on page 1282 of Ind. Eng. Cham., vol. 32, No. 10, October, 1940.

Although procedures for the preparation of Butyl rubber are described in the above-mentioned patent, a general method of preparation will be outlined.

Butyl rubber is prepared by reacting a mono-olefin, such as isobutylene, with a diolefin, such as isoprene, at a temperature below 0° C. in the presence of a Friedel-Crafts catalyst, such as aluminum chloride. In a typical preparation ½ to 20 parts of isoprene and 99½ to 80 parts of isobutylene are mixed with aluminum chloride dissolved in an organic solvent which forms no complex with the catalyst and is liquid at the reaction temperature that is preferably in the range from —50° C. to about —160° C. A useful solvent for the catalyst is an alkyl halide, such as methyl chloride or ethyl chloride.

The resulting copolymer is a tough elastic product resistant to oxidation and chemical attack. It is characterized by low unsaturation indicated by an iodine number below 50 and has an average molecular weight above 15,000 and usually between 30,000 and 80,000. Butyl rubber can be processed on normal rubber machinery. It becomes soft and plastic at roll temperatures of the order of 80 to 100° C. Vulcanization is effected by heating with sulfur and zinc oxide and with other sulfurization aids as described in the above-mentioned patent, which also shows that certain other compounding agents, including fillers and softeners, are advantageously employed.

Now, in accordance with the present invention, it is found that in order to impart improved cold resistance to the vulcanized product, a specific type of agent must be used.

The ester derivatives of azelaic acid now found to be very effective for increasing their cold resistance of the butyl rubber vulcanizates are the azelates of aliphatic and aromatic alcohols. From about 5 to 60% by weight of these esters based on the weight of pure copolymer gum are to be incorporated.

In determining the cold or freeze resistance quality of the vulcanizates, a method termed "the envelope freeze test" was used. This is a very severe test conducted on samples of the vulcanizate stocks calendered on fabric.

TEST PROCEDURE

A piece of the calendered fabric 4" x 6" is folded in half, with the rubber or vulcanizate coating on the inside. With the folded edge of this resultant 4" x 3" speciman at the bottom, the two bottom corners are folded again into two isosceles triangles 1½" x 1½" x 2" leaving a 1" portion of the original fold between them. The envelopes are placed in the cold box at the specified temperature with a 650 g. weight over the folds. After five hours the envelopes are snapped open as rapidly as possible in the cold box by grasping the top open ends. Cracking through to the fabric at the fold constitutes a failure.

Representative data on the vulcanizate formulation and the test results are as follows:

Formulae

|  | A | B | C | D | E |
|---|---|---|---|---|---|
| Isobutylene-Isoprene Copolymer | 100 | 100 | 100 | 100 | 100 |
| Zinc Oxide | 5 | 5 | 5 | 5 | 5 |
| Stearic Acid | 1 | 1 | 1 | 1 | 1 |
| Tuads [1] | 1 | 1 | 1 | 1 | 1 |
| Selenac [2] | 1 | 1 | 1 | 1 | 1 |
| Sulfur | 2 | 2 | 2 | 2 | 2 |
| Wax | 3 | 3 | 3 | 3 | 3 |
| Clay | 75 | 75 | 75 | 75 | 75 |
| Diamyl Azelate |  | 15 |  |  |  |
| Dibenzyl Azelate |  |  | 15 |  |  |
| Tributyl Phosphate |  |  |  | 15 |  |
| Dibenzyl Sebacate |  |  |  |  | 15 |

Tensile-elongation

|  | A, lb. Per cent | B, lb. Per cent | C, lb. Per cent | D, lb. Per cent | E, lb. Per cent |
|---|---|---|---|---|---|
| Modulus at 300% Elong.-Shore Hardness 60' cure at 287° F | 2,410-730 350- 45 | 2,160-730 170- 33 | 2,100-840 100- 28 | 2,000-710 120- 34 | 2,270-840 120- 28 |

Freeze resistance-envelope test

|  | A | B | C | D | E |
|---|---|---|---|---|---|
| −20° F | OK | OK | OK | OK | OK. |
| −40° F |  | Failed | OK | Bad Crease | Failed. |
| −50° F |  |  | Sl. Crease [3] | Failed |  |
| −60° F |  |  | Failed | Sl. Crease.[3] |  |
| −70° F |  |  |  | Failed |  |

[1] Tetramethyl Thiuram Disulfide.
[2] Selenium Tetraethyl Dithiocarbamate.
[3] Slight Crease.

The data illustrates how the azelates, both aliphatic and aromatic, confer greatly improved cold resistance on the vulcanizates, substantially even more improvement than previously used additives such as tributyl phosphate and dibenzyl sebacate.

Advantageously, the cold-resistant stock improved by the azelates remained light in color, had little or no odor, and had a low heating loss, resulting in retention of the desired freeze properties over long periods of time. These azelates do not destroy the normal tack of butyl rubber, thus permitting normal building operations, and allowing good adhesion to fabrics. There was no evidence of bleeding from either the uncured or cured stock. The tensile strength of the stock is little effected by these esters although the modulus and Shore hardness were somewhat reduced.

The only useful azelates known for the objects of this invention are accordingly those in which both carboxyl radicals of azelaic acid are esterified by the aliphatic and aromatic alcohols. The aliphatic alcohol may be an isoaliphatic alcohol, as for example, isobutyl alcohol.

It is not intended that the invention be limited by the examples given for the purpose of illustration, since modifications of the invention as set forth may be made without departing from the spirit and the scope thereof.

I claim:

1. A composition of matter containing, a synthetic, solid, plastic, hydrocarbon interpolymer of a major proportion of isobutylene with a minor proportion of a conjugated diolefin having 4 to 8, inclusive, carbon atoms per molecule, the polymer being characterized by a low unsaturation below an iodine number of 50, a molecular weight above 15,000, and reactivity with sulfur to yield an elastic product, together with 5 to 60 weight percent of dibenzyl azelate.

2. A synthetic solid, plastic, hydrocarbon interpolymer of a major proportion of isobutylene with a minor proportion of isoprene, the polymer being characterized by a low unsaturation below an iodine number of 50, a molecular weight above 15,000 and reactivity with sulfur to yield an elastic product, together with 5 to 15 weight percent of dibenzyl azelate.

3. A vulcanized, synthetic, solid, elastic hydrocarbon polymer of a major proportion of isobutylene with a minor proportion of isoprene, said vulcanized elastic polymer having an elastic limit and a tensile strength at break above 1000 pounds per square inch together with 5 to 15 weight percent of dibenzyl azelate.

4. A synthetic, solid, plastic, hydrocarbon interpolymer of a major proportion of isobutylene with a minor proportion of a conjugated diolefin having 4 to 8, inclusive, carbon atoms per molecule, the polymer being characterized by a low unsaturation below an iodine number of 50, a molecular weight above 15,000, and reactivity with sulfur to yield an elastic product; with 5 to 60 weight percent of an ester of azelaic acid wherein both carboxyl radicals are esterified with an alcohol selected from the group consisting of isobutyl alcohol, amyl alcohol and benzyl alcohol.

5. A composition of matter containing a synthetic, solid, plastic, hydrocarbon interpolymer of a major proportion of isobutylene with a minor proportion of a conjugated diolefin having 4 to 8, inclusive, carbon atoms per molecule, the polymer being characterized by a low unsaturation below an iodine number of 50, a molecular weight above 15,000, and reactivity with sulfur to yield an elastic product; together with 5 to 60 weight percent of diamyl azelate.

6. A synthetic solid, plastic, hydrocarbon interpolymer of a major proportion of isobutylene with a minor proportion of isoprene, the polymer being characterized by a low unsaturation below an iodine number of 50, a molecular weight above 15,000 and reactivity with sulfur to yield an elastic product; together with 5 to 60 weight percent of diamyl azelate.

7. A vulcanized, synthetic, solid, elastic hydrocarbon interpolymer of a major proportion of isobutylene with a minor proportion of isoprene, said vulcanized elastic polymer having an elastic limit and a tensile strength at break above 1000 pounds per square inch; together with 5 to 15 weight percent of diamyl azelate.

WINTHROPE C. SMITH.

REFERENCES CITED

The following references are of record in the file of this patent:

UNITED STATES PATENTS

| Number | Name | Date |
|---|---|---|
| 2,325,948 | Garvey | Aug. 3, 1943 |
| 2,392,855 | Lightbown et al. | Jan. 15, 1946 |